Sept. 10, 1940.　　　　D. S. BAKER　　　　2,213,974
QUIZ DEVICE
Filed Oct. 28, 1939　　　2 Sheets-Sheet 1
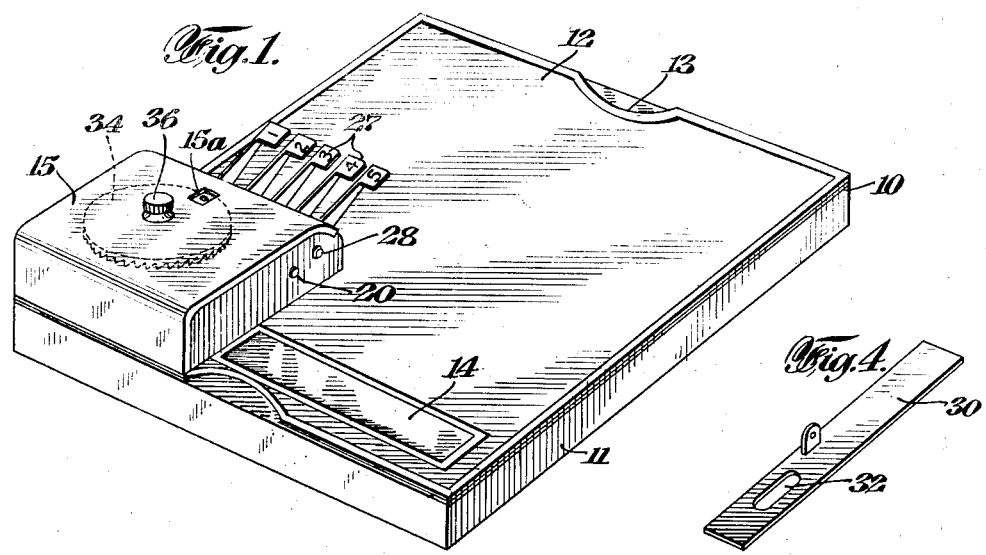
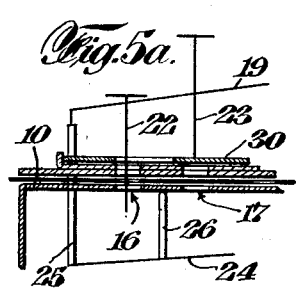
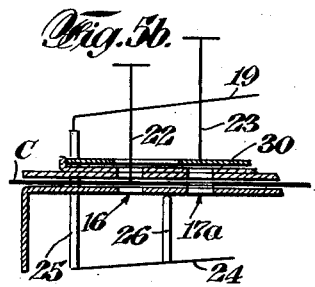
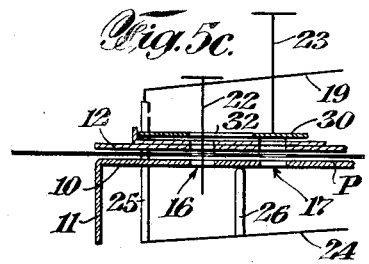
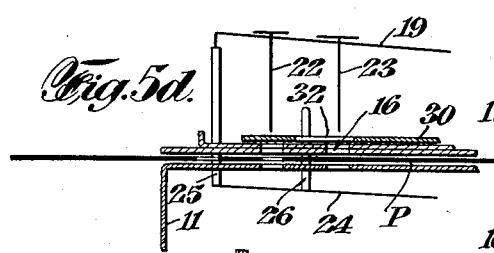
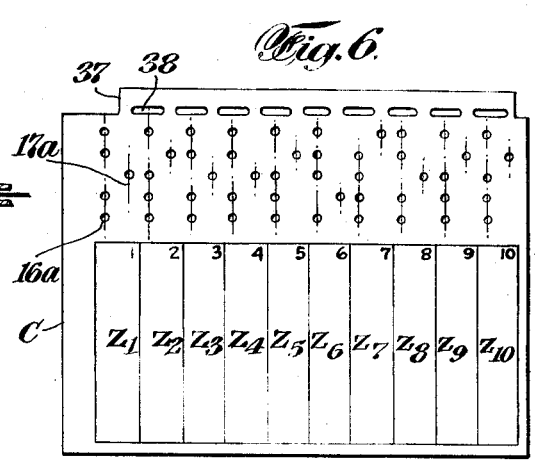
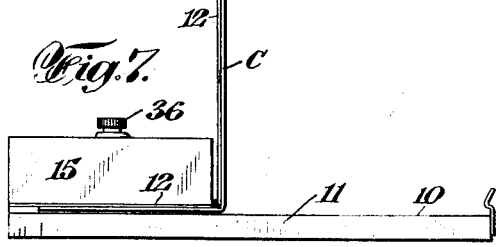
INVENTOR
David S. Baker
BY Kenyon & Kenyon
ATTORNEYS Sept. 10, 1940.　　　　　D. S. BAKER　　　　　2,213,974
QUIZ DEVICE
Filed Oct. 28, 1939　　　　2 Sheets-Sheet 2
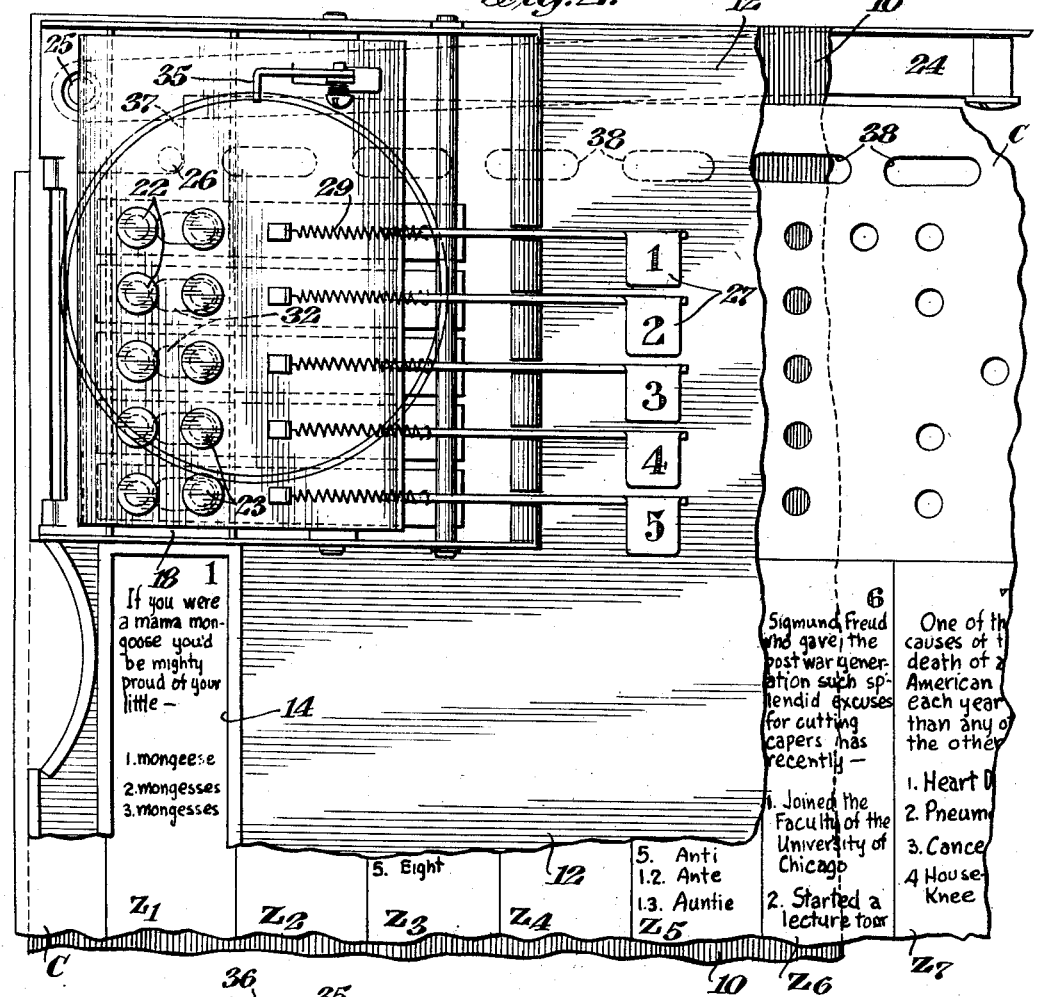
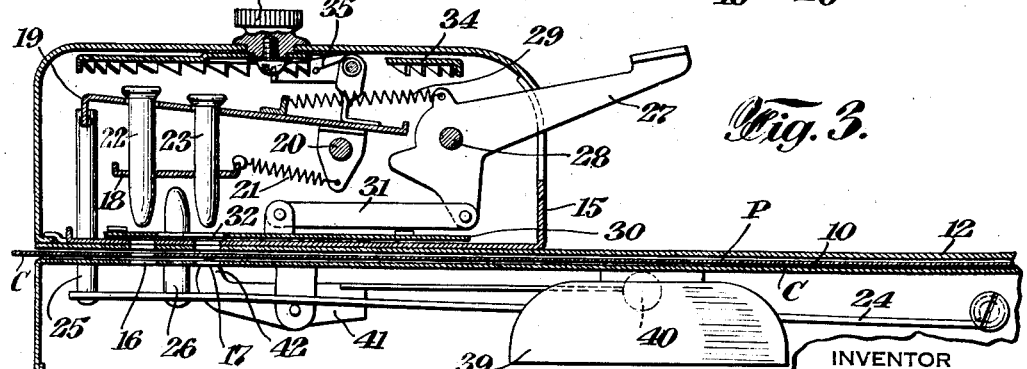
INVENTOR
David S. Baker
BY Kenyon & Kenyon
ATTORNEYS Patented Sept. 10, 1940

2,213,974

UNITED STATES PATENT OFFICE 2,213,974

QUIZ DEVICE

David S. Baker, Greenwich, Conn.

Application October 28, 1939, Serial No. 301,705

33 Claims. (Cl. 35—48)

This invention relates to quiz devices and more particularly to a mechanical device for testing a person's knowledge.

According to this invention, a card or the like is divided into a succession of zones in each of which is printed a question, together with several suggested answers, of which at least one is the correct answer. The quiz device comprises a frame provided with a passageway to receive said card and means are provided for holding the card in the passageway with the first question and suggested answers displayed and the remaining questions concealed. Means are provided for enabling the operator to indicate which suggested answer he believes to be the correct answer. If such means are operated to indicate the correct answer, the card is released and may be advanced a distance equal to the width of a zone to display the next question. If said means are operated to indicate an incorrect answer, the card is held against advancement and will be released for advancement only upon subsequent operation of the indicating means to select the correct answer. A counter is provided for registering the total number of times that the indicating means is operated for each card, thus giving the rating of the operator for the card.

A preferred embodiment of the invention is illustrated in the accompanying drawings, in which:

Fig. 1 is a perspective view;

Fig. 2 is a plan view partially broken away;

Fig. 3 is a section on the line 3—3 of Fig. 2;

Fig. 4 is a perspective view of one element of the device;

Figs. 5a, 5b, 5c and 5d are schematic sections illustrating the operation of the device;

Fig. 6 is a plan view of the question card; and

Figs. 7 and 8 illustrate modifications.

The device shown in the drawings is provided with a base 10 consisting of a metal sheet having downturned supporting flanges 11. A plate 12 is connected along two edges to the plate 10 in spaced relation thereto to form a passageway P to receive a card or the like, the plate 12 being provided with recesses 13 in its opposite ends and with a sight slot 14 at one end, extending part way across the plate. A housing 15 is supported on the plate 12 in the upper left-hand corner thereof between the edge of the plate and the end of the sight slot 14. The passageway P is adapted to receive a card C (Fig. 6) for advancement therethrough. The card C is divided into a plurality of zones $Z_1$ to $Z_{10}$ respectively, each of which is of proper size and arrangement that it can be brought into register with the sight slot 14.

The plates 10 and 12 are provided with a first row of alined apertures 16 and a second row of alined apertures 17. The arrangement of said apertures is such that the center lines of the two rows are parallel to each other and are perpendicular to the direction of travel of the card C with each aperture 16 in the first row corresponding to an aperture 17 in the second row. A guide plate 18 is supported by the housing 15 above the apertures 16 and 17 and a plate 19 is pivotally supported in the casing 15 by a pintle 20 with its major portion overlying the guide plate 18. A spring 21 tends to swing the plate 19 to move its overlying portion away from the plate 18. Both the plate 18 and the plate 19 are provided with two rows of alined apertures, in which are arranged pins 22 and 23 having heads engaging the upper surface of the plate 19 so that they have lost motion connection therewith. The number and arrangement of the pins 22 is such that they are adapted, upon movement of the plate 19 toward the plate 18, to enter the first row of holes 16 and the number and arrangement of the pins 23 is such that they are adapted to enter the holes 17 upon movement of the plate 19 toward the plate 18.

A leaf spring 24 is connected at one end to a side top flange 11 at the right end thereof and extends nearly the full length of the base. A link 25 connects the free end of the spring 24 to the free end of the plate 19, so that the two free ends move in unison. A stud 26 carried by the spring 24 near its free end extends upwardly through alined apertures in the plates 10 and 12.

A plurality of keys 27 are pivotally mounted on a shaft 28 in the housing 15 and extend through slots in the housing wall, the keys being provided with successive identifying numerals beginning with one and the number of keys being equal to the number of pins in each row thereof. A spring 29 for each key 27 is attached at one end to the key and at the other end to the plate 19, in such manner that the spring tends to rotate the key counter-clockwise. A slide 30 for each key 27 is connected thereto by a link 31 in such manner that clockwise rotation of the key causes movement of the slide from right to left. Each slide 30 extends below the ends of corresponding first and second row pins, and has a slot 32 which, in the extreme right position of the slide, is in register with the second row pin but is out of register with the first row pin and in its extreme left position is in register with the second row pin but is out of register with the first row pin. A ratchet wheel 34 is rotatably supported in the housing 15 and is provided with numerals which are visible through an aperture 15a in the housing. A spring-pressed pawl 35 is supported by the plate 19 for co-operation with the ratchet teeth to advance such wheel sufficiently upon each actuation of the plate 19 to bring the next higher numeral into register with the aperture. A knob 36 is provided for rotating the ratchet wheel from the exterior of the housing.

The card C is cut away at its upper left-hand corner to provide a shoulder 37 which, when the card is inserted in the machine engages the stud 26 to locate the zone $Z_1$ in register with the slot 14. The card also is provided with a series of slots 38 into which the stud 26 is adapted to be projected, in different positions of the card C in which successive zones register with the slot 14, to hold such card against leftward movement by contact of the right end of the slot with the stud. For each zone, the card is provided with two rows of apertures 16a and 17a, the arrangement of these apertures being such that they are in register with the pins 16 and 17 when the zone is in register with the sight slot 14. The total number of apertures in a set of rows 16a and 17a is one-half the number of apertures in a set of rows 16 and 17. In each zone is printed a question, together with a plurality of suggested answers, which are identified by successive numerals beginning with one. If only one of the suggested answers is correct, there is provided only a single hole 17a, but if more than one of the suggested answers is correct, there will be a correspondingly greater number of holes 17a. The hole 17a corresponds to the key 27 bearing the same numeral as the numeral assigned to the correct question.

In making use of the above-described device, the card C is inserted into the passageway until its movement is stopped by engagement of the shoulder 37 with the stud 26. Both sets of pins 22 and 23 are in the position shown in Fig. 3 and all the keys are in their extreme counter-clockwise position with the corresponding slides in their extreme right position. The operator then pushes down on one of the keys 27, thereby moving the corresponding slide 30 to its extreme left position and effecting counterclockwise movement of the plate 19 to permit the pins 22 and 23 to move downwardly by gravity, the downward movement of the pin 23 corresponding to the actuated key 27 being prevented by the actuated slide 30. Downward movement of the plate 19 also effects downward movement of the stud 26 to disengage it from the shoulder 37.

Assume first that the operator has actuated a wrong answer key. The pin 22, corresponding to the actuated key passes through the slot 32 of the actuated slide 30 into the corresponding card hole 16a, thereby preventing leftward movement thereof and the pin 23 corresponding to the actuated key is held in elevated position by the actuated slide (Fig. 5a). The remaining pins 23 are held in elevated position by the unactuated slides 30 and the remaining pins 22 move downwardly into engagement with the top surface of the card.

Now assume that the operator actuates the correct answer key. The pins 22, except the one corresponding to the actuated key, are held against downward movement by the unactuated slides 30 and the pins 23, except the one corresponding to the actuated key, move downwardly into engagement with the top surface of the card. The pin 22, corresponding to the actuated key, passes through the slot 32 in the actuated slide 30 into engagement with the top surface of the card and the pin 23 corresponding to the actuated key is held in elevated position by the actuated slide 30 (Fig. 5b). The card may now be moved leftward until the aperture 17a comes into register with the pin 22 corresponding to the actuated key, whereupon said pin drops into the aperture to arrest leftward movement of the card (Fig. 5c). In such position of the card, the next zone $Z_2$ is only in partial registration with the sight slot 14, and the front end of the first slot 38 is in register with the stud 26. Further leftward movement of the card to bring said zone into full registration with the sight slot is accomplished by releasing the actuated key 27 and pulling the card. Upon return of the actuated key to its original position, the pin 22 is lifted out of locking position and the stud 26 enters the slot 38, thereby leaving the card free for leftward movement (Fig. 5d). Further movement of the card to the left to bring the zone $Z_2$ into complete registry with the sight slot brings the rear end of the slot 38 into contact with the stud 26 thereby preventing further leftward movement of the card.

After each operation of a key, the operator pulls on the card with the key in actuated position. If the answer selected by the operator is correct, the card is advanced as above described, but if the answer selected is incorrect, the card is held against advancement.

Each operation of a key effects advancement of the wheel 34 to bring the next higher numeral into register with the aperture 15a. The visible numeral shows the number of times that a key has been actuated and thus provides a scoring arrangement.

Within the base is arranged a bell 39 and a clapper 40 for said bell is carried by a lever 41 pivotally supported from the plate 11. The lever 41 has a tongue 42 projecting through a slot in the plate 19 in position to engage the slots 38 of the card C. Each time the card C is advanced a step, the lever 41 is actuated to ring the bell 39.

As illustrated in Fig. 7, the plate 12 may be formed in two hinged parts so that a portion thereof may be lifted to vertical position to facilitate insertion of the card C. Also, as shown in Fig. 8, instead of a card, the questions may be arranged on a long web supported by spools or reels 43 which may be rotated to advance the web.

In the event that the number of suggested answers to a question exceeds the number of keys, the excess answers are allocated different combinations of keys and the answers are identified by two or more numbers as indicated in the fifth zone of the card shown in Fig. 2. With such arrangement, a combination of keys has to be actuated to indicate the selection of one of the answers in excess of the numbers of keys and the aperatures 16a and 17a are correspondingly arranged.

When the machine is ready for operation, a card C lies in the passageway P with its shoulder 37 engaging the stud 25 and the dial 34 is set to register zero at the aperture 15a. Each time the operator indicates an answer selection, either by operation of a single key or by simultaneous operation of more than a single key, the plate 19 is tilted to cause the pawl 35 to advance the scoring dial 34 one step. If the operator makes a correct answer selection each time, the card C is advanced a step for each key operation so that the card is moved through the machine on ten key operations. The dial then registers a perfect score of 10. However, should the operator instead of making a correct answer selection, make an incorrect answer selection, the dial will be advanced one unit for each incorrect selection. Assuming that there are five proposed answers for each question, it is possible that the operator may total a score of 50 if for each question he selects four incorrect answers before selecting the correct answer. Therefore, on the basis of five answers to a question and ten answers to a card, the operator may obtain a score within the range of 10 to 50, a perfect score being 10. Should the total answers to the ten questions exceed 50, the poorest score will exceed 50 by the same number that the answers exceed 50. The minimum number of key operations for each question is one and the maximum number of key operations for each question is the same as the number of proposed answers. Whether the operator performs the maximum or minimum number of key operations, eventually he will have selected the correct answer for each question as the card cannot be advanced except upon selection of the correct answer. The operator's rating with respect to a particular card depends upon the number of key operations which he has required in excess of the minimum and his rating is inverse to the number of key operations above the minimum.

While the device is shown as provided with actuating keys 27, it is contemplated that in a modified form the keys may be dispensed with to reduce the cost of manufacture. In such modification, the slides 30 and the plate 39 are made directly accessible as by providing extensions passing through the housing 15 by which a slide and the plate may be operated in proper relation to each other by pressure applied independently thereto.

It is of course understood that various modifications may be made in the device above described without in any way departing from the spirit of the invention as defined in the appended claims.

I claim:

1. A device of the character described comprising a first row of vertically movable pins, a second row of vertically movable pins, a base having apertures into which said pins are movable, a vertically movable member having lost motion connection with said pins, resilient means normally maintaining said member in elevated position with the lower ends of said pins above said base member, a plurality of pivoted keys each adapted to engage said member to effect downward movement thereof, a slide connected to each key and having a slot adapted in one position to underlie one first row pin and in a second position to underlie the corresponding second row pin.

2. A device of the character described comprising a base having a first row of apertures and a second row of apertures, a member movable toward and away from said base, resilient means tending to move said member away from said base, a first and a second row of pins having lost motion connection with said member and adapted to move into said apertures, a plurality of keys each adapted to engage said member to force it toward said base, and a slide connected to each key, said slide having a slot adapted in one position to underlie one first row pin and in a second position to underlie a corresponding second row pin.

3. A device according to claim 2 characterized by a stud vertically movable in an aperture in said base, and a connection between said member and said stud for effecting corresponding movement thereof.

4. A device of the character described comprising a base having a first row of apertures and a second row of apertures, a member movable toward and away from said base, resilient means tending to move said member away from said base, a first and a second row of pins having lost motion connection with said member and adapted to move into said apertures, a plurality of keys each adapted to engage said member to force it toward said base, and a slide connected to each key effective in one position to prevent movement of a first row pin and in another position to prevent movement of the corresponding second row pin.

5. A device according to claim 2 characterized by a sheet adapted to be passed between said base and the ends of said pins and having one set of apertures adapted in one position of said sheet to receive all but a predetermined number of first row pins and a second set of apertures adapted to receive said predetermined number of second row pins.

6. A device of the character described comprising means for guiding a card or the like having apertures in predetermined arrangement, a plurality of keys, a stud projectable across said guide means into and out of certain card apertures to control movement of said card in one direction, means including each key for actuating said stud connected to each key for projection across said guide means through card apertures in register therewith, and means actuated by each key to control the operation of certain pins.

7. A device of the character described comprising means for guiding a card or the like divided into zones in which are provided apertures in predetermined arrangement, automatically operated means for co-operating with an aperture in each zone for limiting movement of said card in one direction, a plurality of keys connected to said means to render said means inoperative upon actuation of any key, and key-actuated means responsive to the arrangement of other apertures in a zone for co-operation with said apertures to prevent movement of said card upon actuation of any except one key or key combination and to permit predetermined extent of movement of said card upon actuation of said one key or key combination.

8. A device of the character described comprising means for guiding a card or the like divided into zones in which are provided apertures in predetermined arrangement, a plurality of keys, and key-actuated means responsive to the arrangement of apertures in a zone for co-operation with said apertures to prevent movement of said card upon actuation of any except one key or key combination and to permit predetermined extent of movement of said card upon actuation of said one key or key combination.

9. A device of the character described comprising means for guiding a card or the like having apertures in predetermined relation, a plurality of keys, means effective upon actuation of any except a predetermined key or key combination to co-operate with an aperture to lock said card, and means effective upon actuation of said predetermined key or key combination to co-operate with an aperture only after limited movement of the card to lock said card against further movement.

10. A device of the character described comprising means for guiding a card or the like having two sets of apertures, pairs of pins biased for movement across said guide means through card apertures in register therewith, means for retaining all said pins clear of said guide means, a plurality of keys, connections between each of said keys and said retaining means for rendering the latter inoperative, and means associated with each key for rendering inoperative one of a pair of pins in the normal position of the key and rendering inoperative the other of said pair of pins in the actuated position of said key.

11. A device of the character described comprising means for guiding a card or the like bearing a plurality of questions in spaced relation, and a set of answers for each question associated therewith, a key or key combination corresponding to each answer, and means preventing movement of said card, said means being releasable only by actuation of a key or key combination corresponding to a predetermined answer.

12. A device of the character described comprising means for guiding a card or the like having a plurality of apertures in predetermined arrangement, a plurality of keys, card engaging means common to all keys and actuated by any key to cooperate with an aperture to control movement of said card, a pair of card-engaging members individual to each key and actuated thereby to co-operate with the card apertures to control movement of the card, and means actuated by each key to render inoperative one of the associated card-engaging members with the other member in operative condition.

13. A device of the character described comprising means for guiding a card or the like having a plurality of apertures in predetermined arrangement, a plurality of keys, card-engaging means common to all keys and controlled by any key to co-operate with an aperture to govern movement of said card, additional card-engaging means individual to each key responsive to the arrangement of said apertures for co-operation therewith to prevent movement of said card upon actuation of any except one key or key combination and to permit predetermined extent of movement of said card upon actuation of said one key or key combination.

14. A quiz device comprising means for displaying a question and a plurality of suggested answers of which one is correct, a key or key combination corresponding to each answer, means controlled by actuation of the correct answer key or key combination for indicating selection of the correct answer and by actuation of any other key or key combination for indicating selection of a wrong answer.

15. A quiz device comprising means for guiding a card or the like bearing a question and a plurality of suggested answers of which one is correct, a key or key combination corresponding to each answer, and means operable by each key or key combination except the correct answer key or key combination to lock said card against movement and operable by the correct answer key or key combination to lock said card after movement through a predetermined distance.

16. A device of the character described comprising means for guiding a card or the like having a plurality of apertures in predetermined arrangement, card-engaging means adapted to co-operate with a card aperture to govern movement of said card, pairs of card-engageable elements, a member for controlling movement of said card-engaging means and said card-engaging elements relative to said card, and means individual to each pair of card-engaging elements movable between two positions in each of which it renders inoperative a different one of each of the associated pair of card-engaging elements with the other element in operative condition.

17. A device of the character described comprising a first row of vertically movable pins, a second row of vertically movable pins paired respectively with the pins of the first row, a vertically movable member having lost motion connection with said pins, resilient means normally maintaining said member in elevated position, and a slide individual to each pair of pins and movable between two positions, said slide having a slot adapted in one position to underlie the first row pin and in a second position to underlie the second row pin.

18. A device of the character described comprising means for guiding a card or the like having two sets of apertures, pairs of pins biased for movement across said guide means through card apertures in register therewith, yieldable means for retaining all said pins clear of said guide means and movable means associated with each pair of pins for rendering inoperative different pins of said pair in alternate positions of said means.

19. A device of the character described comprising means for guiding a card or the like having apertures in predetermined arrangement, a stud projectable across said guide means into and out of certain card apertures to control movement of said card in one direction, pairs of pins projectable across said guide means through card apertures in register therewith, a movable member for governing movement of said stud and pins and movable means individual to each pair of pins effective in different positions thereof alternately to render inoperative the pins associated therewith.

20. A device according to claim 7, in which there is provided a counter actuated by each operation of the movable member.

21. A device according to claim 8 in which there is provided a counter actuated by each operation of the movable member.

22. A device according to claim 11 in which there is provided a counter actuated by each operation of the movable member.

23. A device according to claim 12 in which there is provided a counter actuated by each operation of the movable member.

24. A device according to claim 13 in which there is provided a counter actuated by each operation of the movable member.

25. A device according to claim 16 in which there is provided a counter actuated by each operation of the movable member.

26. A device according to claim 17 in which there is provided a counter actuated by each operation of the movable member.

27. A device according to claim 18 in which there is provided a counter actuated by each operation of the movable member.

28. A device according to claim 19 in which there is provided a counter actuated by each operation of the movable member.

29. In combination, guide means, a card slidably engaging said guide means, said card being divided into zones each containing a question accompanied by a plurality of suggested answers of which one is correct, a key or key combination corresponding to each answer, means controlled by actuation of the correct answer key or key combination for indicating selection of the correct answer and by actuation of any other key or key combination for indicating selection of a wrong answer.

30. In combination, guide means, a card slidably engaging said guide means, said card being divided into zones each containing a question accompanied by a plurality of suggested answers of which one is correct and having apertures allocated to the correct answers, means responsive to the position of said apertures and controlled by actuation of the correct answer key or key combination for releasing said card for advancement and by actuation of any other key or key combination for preventing advancement of said card.

31. A quiz device comprising means for displaying a question and a plurality of suggested answers of which one is correct, a key or key combination corresponding to each answer, means controlled by actuation of the correct answer key or key combination for indicating selection of the correct answer and by actuation of any other key or key combination for indicating selection of a wrong answer, and a counter actuated by each operation of a key or key combination.

32. In combination, guide means, a card slidably engaging said guide means, said card being divided into zones each containing a question accompanied by a plurality of suggested answers of which one is correct, a key or key combination corresponding to each answer, means controlled by actuation of the correct answer key or key combination for indicating selection of the correct answer and by actuation of any other key or key combination for indicating selection of a wrong answer, and a counter actuated by each operation of a key or key combination.

33. In combination, guide means, a card slidably engaging said guide means, said card being divided into zones each containing a question accompanied by a plurality of suggested answers of which one is correct, and having apertures allocated to the correct answers, means responsive to the position of said apertures and controlled by actuation of the correct answer key or key combination for releasing said card for advancement and by actuation of any other key or key combination for preventing advancement of said card, and a counter actuated by each operation of a key or key combination.

DAVIS S. BAKER.